Feb. 6, 1962   F. MEYER   3,019,618
APPARATUS FOR THE PREVENTION OF FORMATION OF SUGAR
CRUSTS ON CONTINUOUS TROUGH CONVEYORS
Filed June 10, 1958
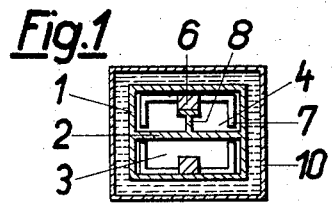
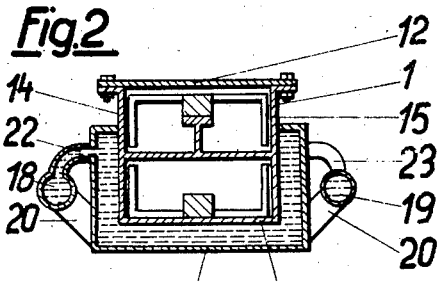
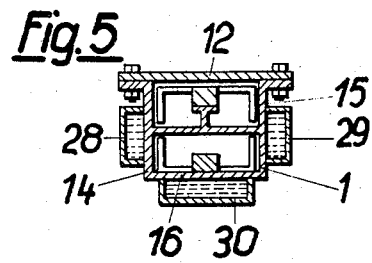
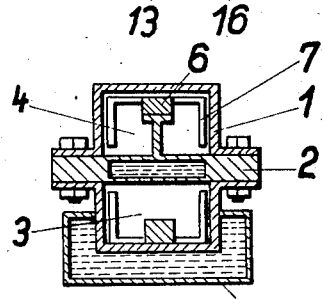
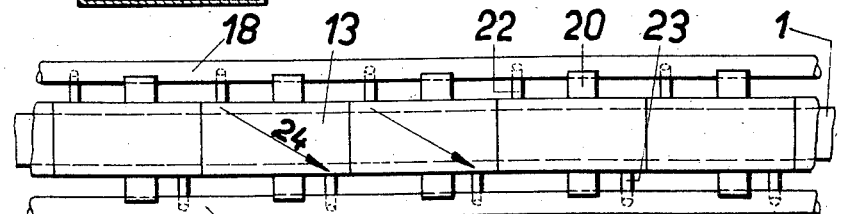
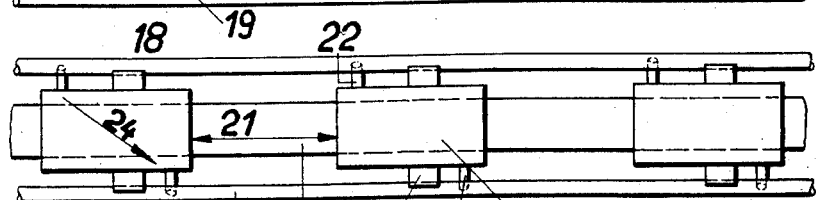
INVENTOR:
FRITZ MEYER
BY C. P. Goepel
his attorney 3,019,618
APPARATUS FOR THE PREVENTION OF FORMATION OF SUGAR CRUSTS ON CONTINUOUS TROUGH CONVEYORS
Fritz Meyer, Uzwil, Switzerland, assignor to Gebrueder Buehler, Uzwil, Switzerland, a Swiss firm
Filed June 10, 1958, Ser. No. 741,023
Claims priority, application Germany June 12, 1957
9 Claims. (Cl. 62—380)

The transport of raw sugar in continuous trough conveyors presents some difficulties, especially in countries with a warm climate. At higher temperatures the sugar releases some humidity and this drier sugar settles on the inner walls of the conveyor trough, forming tough crusts which have to be removed at short time intervals by a protracted scraping or by an intensive scouring with hot water in order to dissolve the sugar crust.

An object of the invention is to provide a method for avoiding these drawbacks. This method is characterised by the production of a thin water layer on the inner wall of the conveying trough for preventing the formation of a sugar crust.

Another object of the invention is to provide a device for embodying this process.

Although the scouring with hot water seems to indicate that it is necessary to use a warm liquid, the invention teaches the opposite idea: a thin water layer is produced by the condensation of humidity on the inner walls of the trough, this condensation resulting from a cooling of the trough walls on the outside.

The improved apparatus of this invention includes other features and details which will be described hereinafter in connection with the accompanying drawing which illustrates several embodiments of the invention. In the drawing:

FIG. 1 is a section of a continuous trough conveyor with chain, perpendicular to the direction of conveying.

FIG. 2 is a corresponding section in another embodiment of the invention.

FIG. 3 shows the conveyor of FIGURE 2 viewed from below.

FIG. 4 is a corresponding view of another embodiment of FIG. 3.

FIGS. 5 to 7 are sections through other embodiments of the invention, perpendicular to the direction of conveying.

The conveying trough 1 (FIG. 1) is divided by an intermediate wall 2 in a conveying compartment 3 for the transport of raw sugar and a chain-return compartment 4. In these compartments there is a conveying chain moving continuously and consisting of chain links 6 provided with U-shaped conveying bars 7. In the chain-return compartment 4 the chain links 6 slide on a rail 8. Around the conveying trough 1 there is a jacket 10 for the circulation of a cooling fluid, generally water. Owing to the cooling of the outside walls of the trough 1, the humidity evaporated from the raw sugar condensates on the inner side of these walls, building up there a thin water layer which prevents the formation of a crust by the sugar coming into contact with these walls. At the intake (not shown) of the conveyor, warm humid air may enter between the sugar crystals and the humidity contained in this air condensates on the inner side of the walls of the conveying compartment 3.

In the embodiment of FIG. 2 the conveying trough 1 is provided with a screwed-on cover 12. A common cooling jacket 13 is fixed to the side walls 14, 15 and to the lower wall 16 of the conveying trough 1. A feed line 18 and a return line 19 for the cooling liquid are fastened to the cooling jacket 13 by means of brackets 20.

If the cooling liquid had to flow along the whole length of the conveying trough 1, it would reach too high a temperature at the end of the cooling jacket 13. To prevent this high temperature several cooling jackets 13 are provided one after another over the length of the conveying trough 1 (FIG. 3). Spaces 21 may be disposed between successive cooling jackets 13 (FIG. 4) if a less intensive cooling is sufficient.

The cooling fluid intake 22 at the beginning of a cooling jacket 13 is disposed near the upper part of the outer side wall 14 and the cooling fluid outlet 23 at the end of jacket 13 is disposed near the upper part of the side wall 15. Thanks to this disposition the cooling fluid must flow along the entire cooling jacket 13, approximately in the direction of the diagonal arrows 24 (FIG. 3).

In the embodiment of FIGURE 5 separate cooling jackets 28 to 30 are provided on the side walls 14, 15 and on the lower wall 16 of the conveying trough 1.

In the embodiment of FIGURE 6 the intermediate wall 2 is bolted between the compartments 3, 4. On the upper wall 32 of the conveying trough 1 there is a cooling fluid tube 34 provided with sprinkling openings 33.

In the embodiment of FIGURE 7 the intermediate wall 2 is hollow and is provided with a fluid cooling.

The invention is not limited to trough conveyors with chain but could be used for other trough conveyors such as worm conveyors and the like.

I claim:

1. A conveyor for conveying a continuous stream of raw sugar at elevated temperature, said continuous stream having humid air entrained therein, said conveyor including a housing having top, bottom and side walls, conveying means comprising U-shaped conveyor bars that fit within a rectangular trough formed by said walls, said conveying means moving said stream of raw sugar at elevated temperature therethrough and cooling means for cooling at least one of said walls to a temperature lower than said elevated temperature to condense thereon moisture from said humid air, said moisture forming on said cooled wall within said housing to form a liquid layer thereon whereby said liquid layer prevents the formation of sugar crusts on said wall as said sugar is conveyed therethrough.

2. A conveyor according to claim 1 wherein said cooling means comprises at least one cooling jacket and a cooling fluid in said jacket.

3. A conveyor according to claim 2 wherein said cooling means comprises a cooling jacket on said side wall and said bottom wall.

4. A conveyor according to claim 3 further comprising an outlet for cooling fluid at one end of said cooling jacket adjacent the upper part of one of said side walls and an outlet for said cooling fluid at the other end of said cooling jacket adjacent the upper part of the other of said side walls.

5. A conveyor according to claim 2 wherein said cooling means comprises a cooling jacket on said bottom wall and each of said side walls, said cooling jackets on said bottom wall and each of said side walls being separate.

6. A conveyor according to claim 2 wherein a cooling fluid line provided with fluid openings connected to said cooling jacket extends along said top wall.

7. A conveyor according to claim 2, said conveyor including a wall intermediate said top and bottom walls extending parallel to said top and bottom walls and connected at its opposite ends to said side walls, said intermediate wall dividing said housing into a first and a second compartment, said conveying means including a conveying chain in said compartments, and cooling means for cooling said intermediate wall.

8. A conveyor according to claim 2 wherein said cooling jacket on said bottom and said side walls extends along said walls and said conveyor.

9. A conveyor according to claim 8 wherein said cooling jackets are spaced apart.

References Cited in the file of this patent

UNITED STATES PATENTS 2,808,236    Dickinson _____ Oct. 1, 1957

FOREIGN PATENTS 425,384    Germany _____ Feb. 18, 1926